Patented Nov. 28, 1933

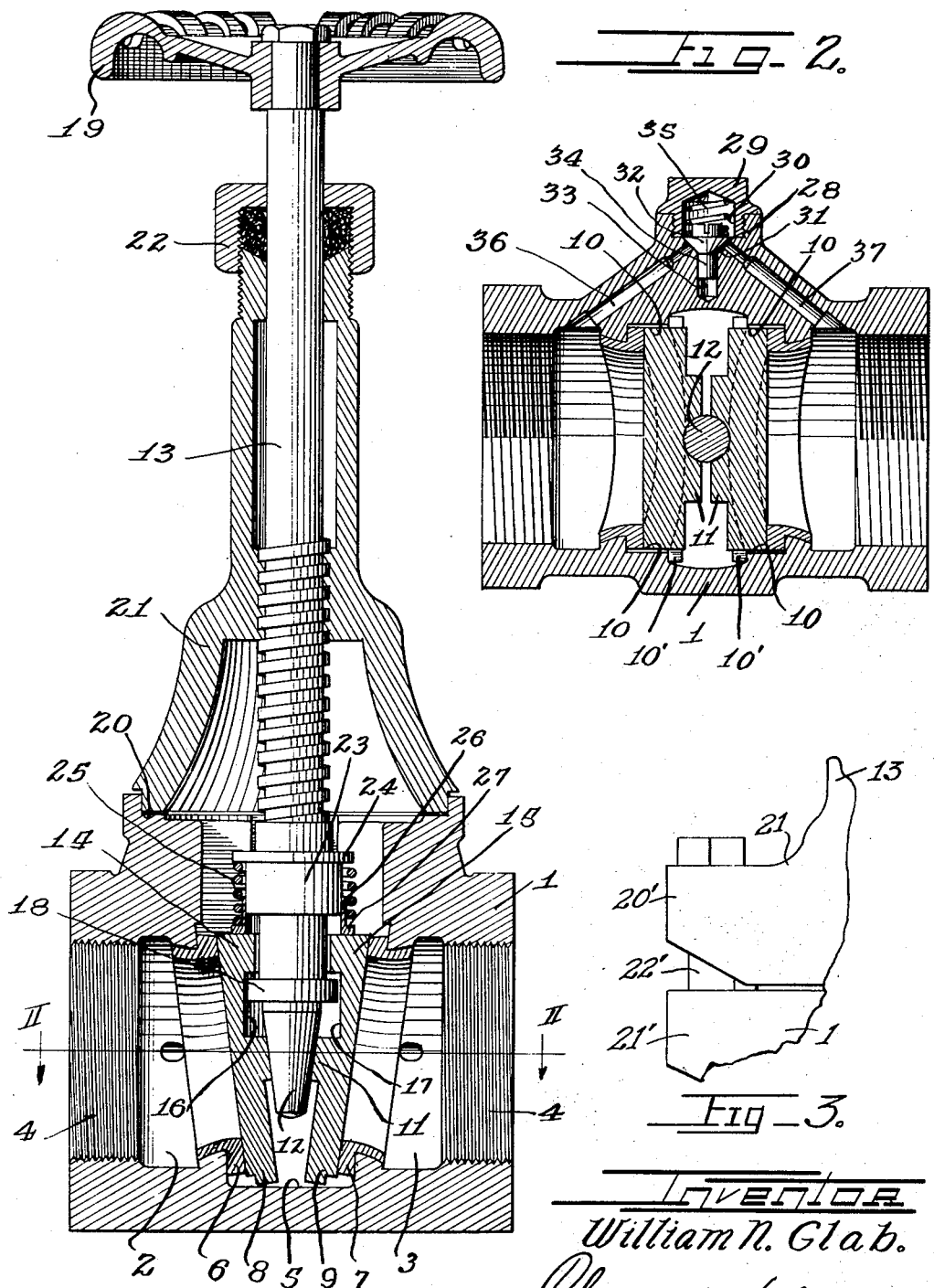

1,936,873

UNITED STATES PATENT OFFICE 1,936,873

BY-PASS GATE VALVE

William N. Glab, Dubuque, Iowa, assignor to Morrison Bros., Dubuque, Iowa, a corporation of Iowa Application December 22, 1930
Serial No. 503,958

8 Claims. (Cl. 277—54)

This invention relates in general to a valve, and is more particularly concerned with improved means for by-passing the valve.

Heretofore in installing a gate valve having a by-pass for relieving the supply pipe of excessive pressure, it has been necessary to connect the supply pipe to the pipe connectioin of the valve in communication with the inlet side of the by-pass means in order to render the by-pass valve operative. This arrangement is not foolproof for the reason that an installer is quite apt to install the valve in a reverse position, thereby disposing the by-pass means on the outlet side of the gate valve and rendering it ineffective to relieve the supply line of excessive pressure.

It is a primary object of this invention to provide a gate valve having by-pass means which is operative regardless of which of the two pipe connections of the gate valve is connected to the inlet or supply pipe, the valve thereby being "foolproof" and always correctly installed.

It is a further object of this invention to provide improved means for operating the main valve member of a gate valve of the like.

Other and further important objects of this invention will be apparent from the disclosures in the accompanying drawing and the following specification.

The invention (in a preferred form) is illustrated on the drawing and hereinafter more fully described.

On the drawing:

Figure 1 is a vertical sectional view partly in elevation, taken substantially on the center line of the valve.

Figure 2 is a horizontal sectional view taken through the valve casing on substantially line II—II of Figure 1, showing the by-pass mechanism.

Figure 3 is an enlarged fragmentary view showing the details of means for securing the valve cap to the casing.

As shown on the drawing:

In the illustrated embodiment of my invention, there is shown in Figure 1 a gate valve comprising a casing 1 having an inlet opening 2 and an outlet opening 3. Since these openings are similar in construction, either one may be used as an outlet or inlet without affecting the operation of the by-pass mechanism. These openings are internally threaded as at 4 to facilitate the connection of pipes thereto.

The openings 2 and 3 communicate with a main valve chamber 5 and upwardly and outwardly inclined valve seats 6 and 7 are provided at the respective junctions of this chamber and the inlet and outlet openings, the valve seats being spaced apart to receive therebetween valve members 8 and 9. The lateral margins of the valve members extend into guideways 10 formed in the casing 1, which permit the valve members to be slidably moved relative to the valve seats. Also the valve members are provided with lateral lugs 10' (Figure 2) for aiding in the guiding of these members to their seats.

The confronting surfaces of the valve members 8 and 9 each have a projecting portion 11 which is formed intermediate the top and bottom thereof and has a recessed portion for engagement with the lower end 12 of a valve stem 13, the end 12 being beveled to form a conical wedge. The upper margins of the valve members extend inwardly to form projections 14 and 15 which are spaced above the intermediate projections 11 and cooperate therewith to form confronting grooves 16 and 17. A collar 18 is secured to the valve stem 13 and projects into these grooves for engagement with the lower surfaces of the projecting portions 14 and 15 when the valve is actuated by manipulating a hand wheel 19 at the upper end thereof.

The casing 1 is provided with a seat portion 20 for receiving the lower edge of a cap 21 which surrounds and threadedly engages the valve stem 13. The cap 21 is secured to the casing 1 by means of a plurality of peripheral lugs, one of which is shown at 20' in Figure 3, which cooperate with similarly spaced lugs 21' on the casing, a holding down screw or bolt 22' extending thru the former and threadedly engaging the latter. The upper end of this cap is provided with a stuffing box 22 to prevent leakage along the valve stem.

A collar 23 is secured around the lower end of the valve stem 13 above the aforementioned collar 18 and is provided with an annular flange 24 at its upper end for engagement by the upper end of a coil spring 25 which surrounds the collar. A sleeve 26 surrounds and slidably engages the collar 23 for relative axial movement. The lower edge of the sleeve 26 is deflected outwardly to form an annular flange 27 against which the lower end of the spring 25 engages. When the valve members are moved to the seating position, as shown in Figure 1, further operation of the handle 19 will move the collar 18 downwardly out of engagement with the projecting portions 14 and 15 and simultaneously therewith cause the conical end 12 of the valve stem to act as a wedge between the projecting portions 11, the valve members being thereby forced outwardly against the respective valve seats.

It will be observed that with the arrangement just described for operating the valve, when the valve is in the raised position the valve members 8 and 9 will be forced downwardly until the projecting portions 14 and 15 engage the collar 18, the members being held in this position due to the influence of the spring 25. In this position, it will be observed, the conical end 12 of the stem 13 will be disengaged from the projecting portions 11, thereby permitting the lower ends of the valve members to be moved towards each other by the pressure of spring 25, a fulcrum being formed at the points of engagement between the projecting portions 14 and 15 and the collar 18. This action of the spring greatly facilitates the unseating of valve members 8 and 9.

A side of the casing 1 extends outwardly to form an annular flange 28 having its inner surface threaded for receiving a screw plug 29 (Figure 2) having a central cavity or socket 30 which opens into the lower face thereof. That portion of the casing which is adjacent the open end of the socket 30 is countersunk to provide a conical depression 31 which forms a seat for an auxiliary valve 32. The auxiliary valve seat is drilled at its center to form a socket 33 for receiving therein a valve stem 34 which serves to guide the movement of the valve. The upper end of the valve 32 is reduced to form an annular flange constituting a seat for the lower end of a compression spring 35 which extends between the valve and the upper end of the socket 30 for holding the valve in seated position. Cored passageways 36 and 37 are formed in the casing 1, which extend obliquely from the respective inlet and outlet openings of the valve and terminate in the conical surface 31 which forms the seat for the auxiliary valve. It will be observed that the auxiliary valve of my invention will automatically operate to connect the passageways 36 and 37, when the pressure in either of the pipe connections 4 of the gate valve becomes abnormal, depending upon which of the connections is used as an inlet, thereby relieving the pressure and preventing the bursting of pipes, the blowing out of gaskets, and other damage which might otherwise follow the occurrence of an abnormal pressure.

Furthermore, the by-pass means is operative irrespective of which of the two pipe connections 4 of the gate valve is connected to the inlet or supply pipe, the gate valve thereby being reversible in position when being installed without changing or effecting the operation of the by-pass means. As soon as the abnormal pressure is relieved, the auxiliary valve will automatically close.

The valve of my invention therefore provides improved means for actuating the main valve members to open and closed positions, and also a novel auxiliary valve for automatically establishing a by-pass around the main valve upon the occurrence of abnormal pressure in one of the pipe connections of the valve.

I am aware that numerous details of construction may be varied through a wide range without departing from the spirit of this invention, and I therefore do not purpose limiting the patent granted otherwise than as necessitated by the state of the prior art.

I claim as my invention:

1. In a valve having inlet and outlet connections through which fluid is adapted to flow in a single direction, by-pass means actuable in response to an abnormal pressure in either one of said connections for establishing an auxiliary and by-pass passageway between said connections so that in installing the valve either one of said connections may be connected to an inlet pipe without rendering the by-pass means inoperative.

2. In a valve, a casing defining a main valve chamber, an inlet connection and an outlet connection, passageways in communication with said inlet and outlet connections, and a single auxiliary valve for interconnecting said passageways upon the occurrence of abnormal pressure in either one of said connections to by-pass fluid around said main valve chamber.

3. In a valve, a casing defining a main valve chamber and an auxiliary valve chamber, an inlet and an outlet, passageways in the casing connecting the auxiliary valve chamber with the inlet and outlet, and a single valve in the auxiliary valve chamber for normally closing and covering the associated ends of both of said passageways to the inlet and outlet, said auxiliary valve being arranged to open and interconnect the passageways upon the occurrence of abnormal pressure in the inlet or the outlet.

4. In a valve, a casing defining an auxiliary valve chamber and having inlet and outlet connections, passageways extending from said chamber to the inlet and outlet connections, a single valve in the auxiliary valve chamber arranged to simultaneously close the openings of both of said passageways in the auxiliary valve chamber and means for normally maintaining said valve in closed position.

5. In a gate valve including a casing having inlet and outlet connections through which fluid is adapted to flow in only a single direction, and main valve means between said connections and movable into and out of the path of the fluid flowing through the valve, fluid by-passing means between said connections including auxiliary valve means operable in response to an abnormal pressure of the fluid in either of the connections, depending upon which of the connections is used as an inlet, for by-passing the fluid around said main valve means.

6. In a valve including a casing having inlet and outlet connections through which fluid is adapted to flow in only a single direction when the valve is in use, and valve means between said connections, fluid by-passing means comprising a passage in said casing around said valve means between said connections and a valve normally shutting off the flow of fluid in said passage, and seated in a closed position in such a manner as to be sensitive to the pressure of fluid in either of said connections and movable to an open position in response to an abnormal pressure of the fluid in either of the connections for allowing the fluid to be by-passed through said passageways.

7. In a valve including a casing having inlet and outlet connections, and valve means between said connections, fluid by-passing means comprising a valve member having a conical seating surface, a conical seat for said valve member, and passageways extending from said connections and terminating in said valve seat for subjecting the conical seating surface of the valve member to the pressure of the fluid in said connections whereby upon the fluid pressure in either of said connections exceeding a predetermined amount said valve member will be moved off of its seat to open position to allow fluid to flow around said valve means from one connection to the other through said passageways.

8. In a valve including a casing having inlet and outlet connections, and valve means between said connections, fluid by-passing means comprising a valve member having a conical seating surface, a conical seat for said valve member, and passageways from said connections terminating in the valve seat, the axes of the passageways adjacent said seat being substantially at right angles to the seating surface of the valve, whereby an increase of fluid pressure in either of said connections above a predetermined amount will actuate the valve to open position and interconnect the passageways.

WILLIAM N. GLAB.